United States Patent
Wu

(10) Patent No.: US 9,509,248 B2
(45) Date of Patent: Nov. 29, 2016

(54) STEERING DEVICE FOR USE IN SOLAR TRACKING EQUIPMENT

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/538,103

(22) Filed: Nov. 11, 2014

(65) Prior Publication Data

US 2016/0072427 A1    Mar. 10, 2016

(30) Foreign Application Priority Data

Sep. 10, 2014    (TW) .............................. 103131245 A

(51) Int. Cl.
*F16H 1/16*    (2006.01)
*F16H 1/20*    (2006.01)
(Continued)

(52) U.S. Cl.
CPC ................. *H02S 20/32* (2014.12); *F16H 1/16* (2013.01); *F16H 1/203* (2013.01); *F16H 57/022* (2013.01); *F16H 2057/0213* (2013.01); *F16H 2057/0221* (2013.01); *F16H 2057/0222* (2013.01)

(58) Field of Classification Search
CPC ...... H02S 20/32; F16H 1/203; F16H 57/022; F16H 2057/0213; F16H 2057/0221; F16H 2057/0222
USPC .......................................................... 74/425
See application file for complete search history.

(56) References Cited

U.S. PATENT DOCUMENTS

| 5,957,000 A * | 9/1999 | Pecorari ................. F16C 33/78 74/425 |
| 2006/0065037 A1* | 3/2006 | Koppensteiner ......... B21J 13/12 72/420 |

(Continued)

FOREIGN PATENT DOCUMENTS

DE          889104 B      9/1953
DE       19944133 A1     10/2000
(Continued)

OTHER PUBLICATIONS

Office Action dated Jun. 18, 2015 of the corresponding German patent application.
(Continued)

*Primary Examiner* — William Kelleher
*Assistant Examiner* — Zakaria Elahmadi
(74) *Attorney, Agent, or Firm* — Chun-Ming Shih; HDLS IPR Services

(57) ABSTRACT

A steering device for use in solar tracking equipment includes: a fixed base (10); a rotary base (20) correspondingly connected to the fixed base (10) and provided with a worm gear (22); and a driving module (30) disposed in the fixed base (10) and including a worm unit (33) and an adjustment mechanism (34), the worm unit (33) includes a cylindrical body (331) and a worm (332) supported in the cylindrical body (331), and the cylindrical body (331) is pivoted in the fixed base (10), the adjustment mechanism (34) is disposed corresponding to the cylindrical body (331) for adjusting the swinging motion of the cylindrical body (331), thereby enabling the worm (332) and the worm gear (22) to be mutually engaged. Accordingly, the backlash between the worm and the worm gear is able to be adjusted thereby enhancing the rotation precision.

14 Claims, 7 Drawing Sheets

(51) Int. Cl.
*F16H 57/022* (2012.01)
*F16H 57/021* (2012.01)

(56) References Cited

U.S. PATENT DOCUMENTS

| | | | |
|---|---|---|---|
| 2006/0117883 A1* | 6/2006 | Yasuda | B62D 5/0409 74/388 PS |
| 2007/0169482 A1* | 7/2007 | Weightman | F03D 3/068 60/721 |
| 2009/0145254 A1* | 6/2009 | Hirabayashi | B25J 9/103 74/425 |
| 2013/0056000 A1* | 3/2013 | Perrin | F24J 2/14 126/606 |
| 2013/0075189 A1* | 3/2013 | Sekikawa | B62D 5/0409 180/444 |
| 2015/0266506 A1* | 9/2015 | Sato | B62D 5/0409 180/444 |

FOREIGN PATENT DOCUMENTS

| | | | | |
|---|---|---|---|---|
| DE | WO 2012007461 A1 * | 1/2012 | | F16H 1/16 |
| EP | 2735766 A1 | 5/2014 | | |
| JP | H085366 A | 1/1996 | | |
| TW | 491110 U | 6/2002 | | |
| TW | M344568 U | 11/2008 | | |
| TW | M350004 U | 2/2009 | | |
| TW | I426222 B | 2/2014 | | |
| WO | 03102477 A1 | 12/2003 | | |
| WO | 2010097486 A1 | 9/2010 | | |
| WO | 2011128083 A2 | 10/2011 | | |
| WO | 2012007461 A1 | 1/2012 | | |

OTHER PUBLICATIONS

Office Action dated Apr. 22, 2016 of the corresponding Taiwan patent application.

* cited by examiner

STEERING DEVICE FOR USE IN SOLAR TRACKING EQUIPMENT

BACKGROUND OF THE INVENTION

Field of the Invention

The present invention relates to a steering device, especially to a steering device for use in solar tracking equipment.

Description of Related Art

With the trend of developing various types of alternative energy, a solar panel is the most popular for generating electricity, and advantages of green power, low pollution and no noise are provided. Thus, the solar related power generating technology has been widely applied and promoted in recent years. For effectively increasing the time period allowing the solar panel to be operated and increasing the amount of generated electricity, a solar tracking equipment is assembled with the solar panel for meeting different sunlight radiating directions in different seasons. However, there are some shortages to be overcome in the existed solar tracking equipment. As such, the present invention is aimed to overcome the shortages.

A conventional steering device for use in solar tracking equipment mainly includes a fixed base, a worm gear and a driving mechanism, wherein the fixed base is connected to a vertical post of the solar tracking equipment, the worm gear is connected to a carrier of the solar tracking equipment, and a plurality of solar panels are disposed on the carrier, the driving mechanism includes a carrying plate and a worm disposed at one side of the carrying plate, wherein the carrying plate is stacked on top of the fixed base and the worm gear is stacked on top of the carrying plate, thereby enabling the worm gear and the carrier to be rotated in a full circle status relative to the fixed base through the engaging transmission provided by the worm and the worm gear.

However, there still are some problems happened when the conventional steering device for use in solar tracking equipment is operated, because the location relation of the worm and the worm gear is fixed, components such as the worm gear and the carrying plate have to be precisely fabricated with a mechanical process for allowing an adequate engagement between the worm and the worm gear, so the cost for fabricating and processing are relatively high. In addition, the solar tracking equipment is mostly installed in the outdoors, With the ever changing environmental conditions such as wind blowing, sunlight radiating and rain falling, components such as the worm and the worm gear may be deteriorated, thereby causing the steering unable to be processed or the steering not being precise.

SUMMARY OF THE INVENTION

The present invention is to provide a steering device for use in solar tracking equipment, in which the backlash between a worm and a worm gear is adjustable for enhancing the rotation precision.

Accordingly, the present invention provides a steering device for use in solar tracking equipment, which includes a fixed base, a rotary base and a driving module; the rotary base is correspondingly connected to the fixed base and provided with a worm gear; the driving module is disposed in the fixed base and includes a worm unit and an adjustment mechanism, the worm unit includes a cylindrical body and a worm supported in the cylindrical body, and the cylindrical body is pivoted in the fixed base; the adjustment mechanism is disposed corresponding to the cylindrical body for adjusting the swinging motion of the cylindrical body, thereby enabling the worm and the worm gear to be mutually engaged.

Advantages achieved by the present invention are as following: with the installation of the adjustment mechanism, each component made by casting is able to be assembled without being processed with a precise mechanical treatment, thereby lowering the cost for mechanical process and having more flexibilities for arranging the fabrication procedure; through disposing the worm gear in the internal space of a tubular body, the worm gear is able to be effectively prevented from being adhered with dusts or debris existed in the nearby environment, thereby ensuring the transmission stability of the worm and the worm gear and also prolonging the service life of the steering device; by installing U-shaped shaft seats in a case member, the assembly/disassembly of convex shafts or convex shafts and bearings can be facilitated, thereby providing more conveniences in assembly; with the installation of an axial adjustment mechanism, the worm is able to be axially displaced for adjustment, thereby no backlash being generated between the worm and the worm gear; and through installing the driving module is a space defined by the case member and a cover member, the maintenance or replacement for electric components can be facilitated.

DETAILED DESCRIPTION OF THE INVENTION

A preferred embodiment of the present invention will be described with reference to the drawings.

Figure 1:
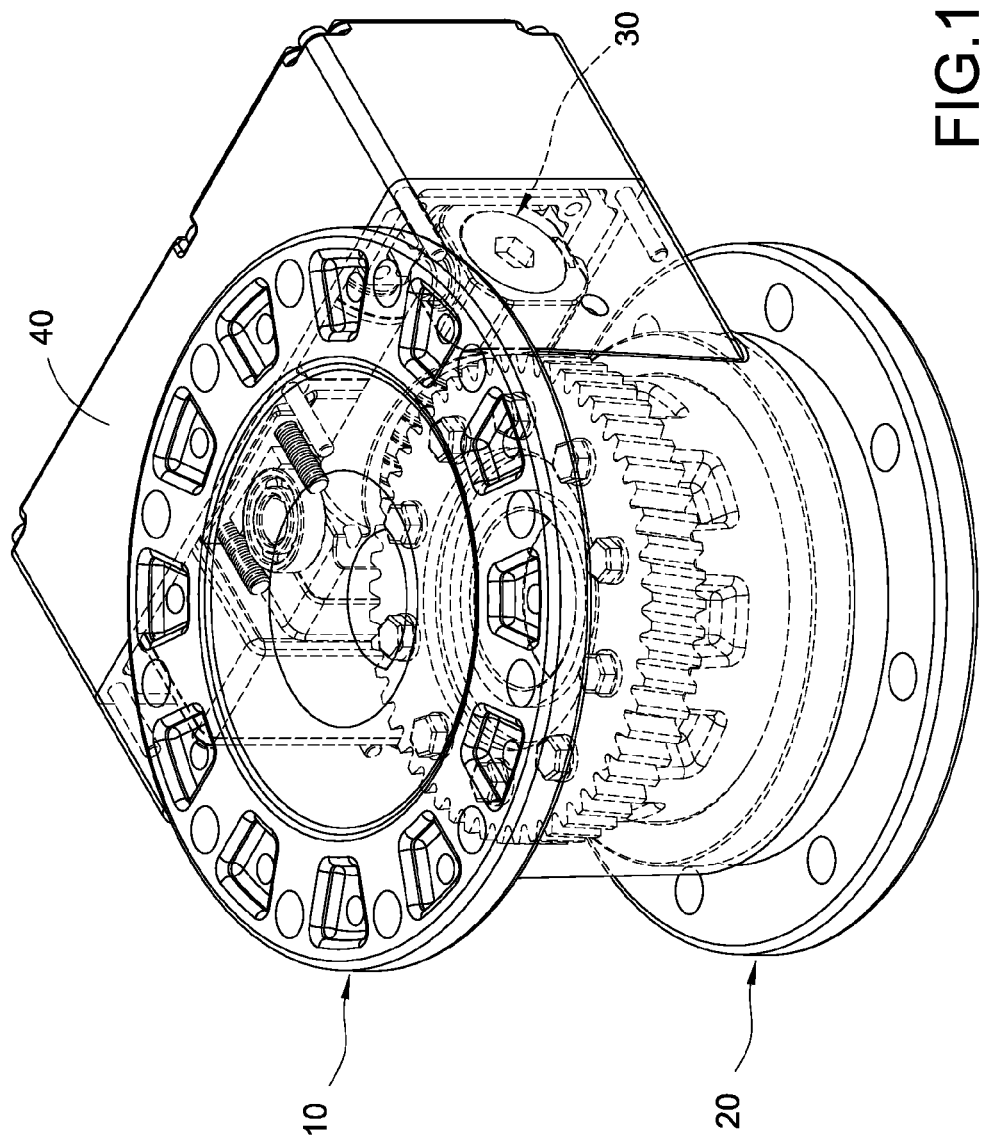
FIG. 1 is a perspective view showing the assembly of the steering device according to the present invention.

Please refer to FIG. 1, the present invention provides a steering device for use in solar tracking equipment, which mainly includes a fixed base (10), a rotary base (20) and a driving module (30).

Figure 2:
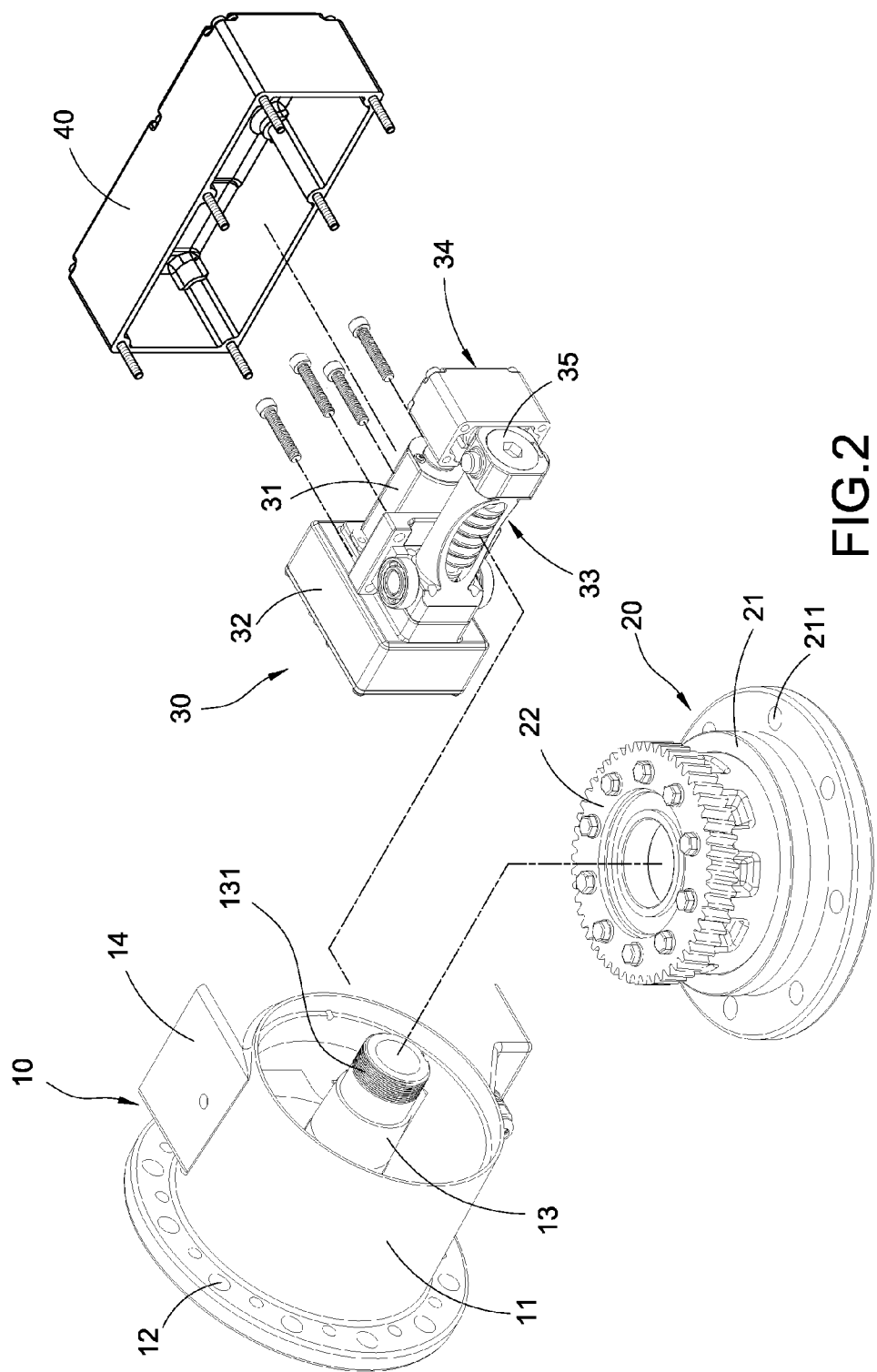
FIG. 2 is a perspective exploded view showing the steering device according to the present invention.
Figure 3:
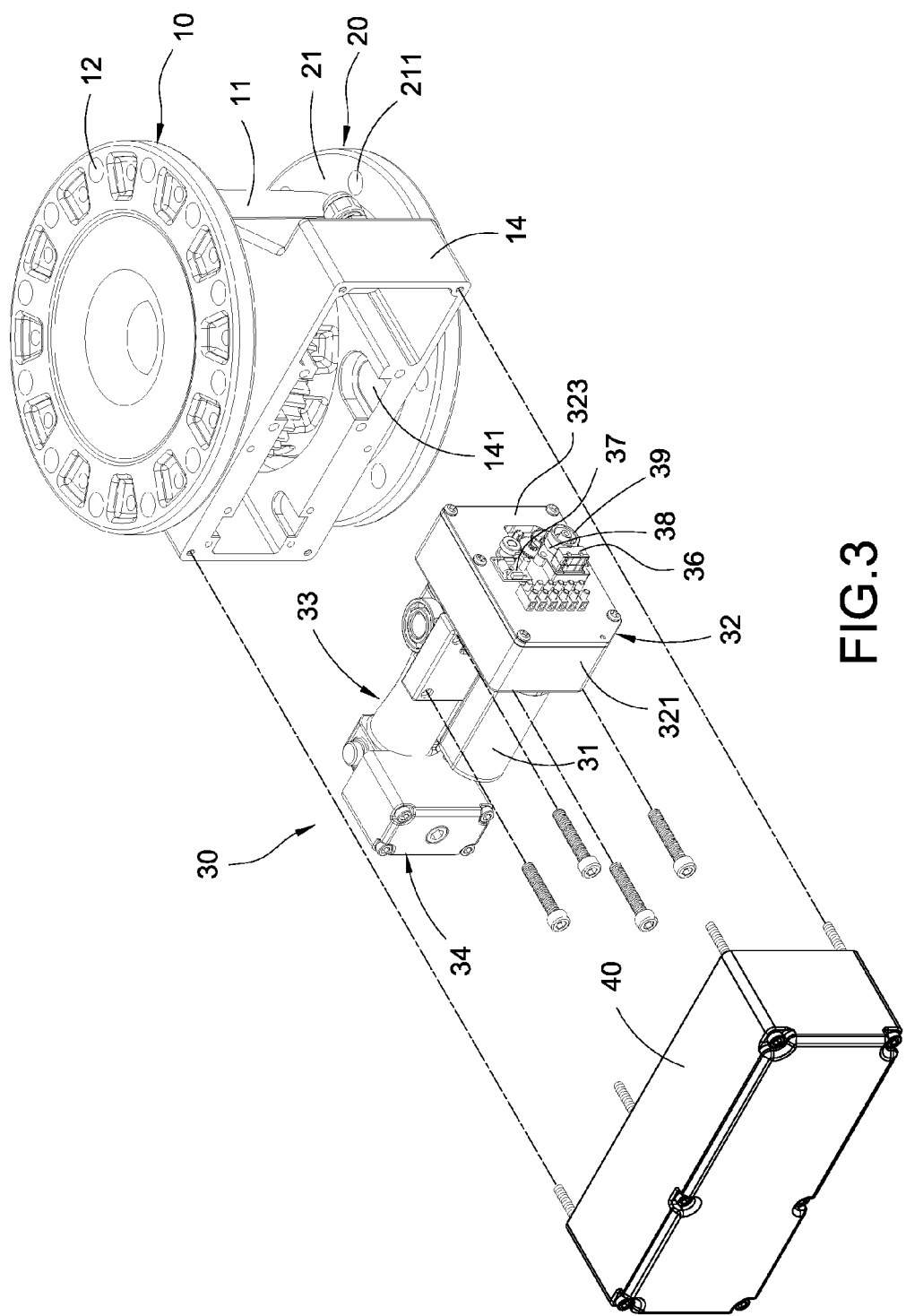
FIG. 3 is another perspective exploded view showing the steering device according to the present invention.
Figure 4:
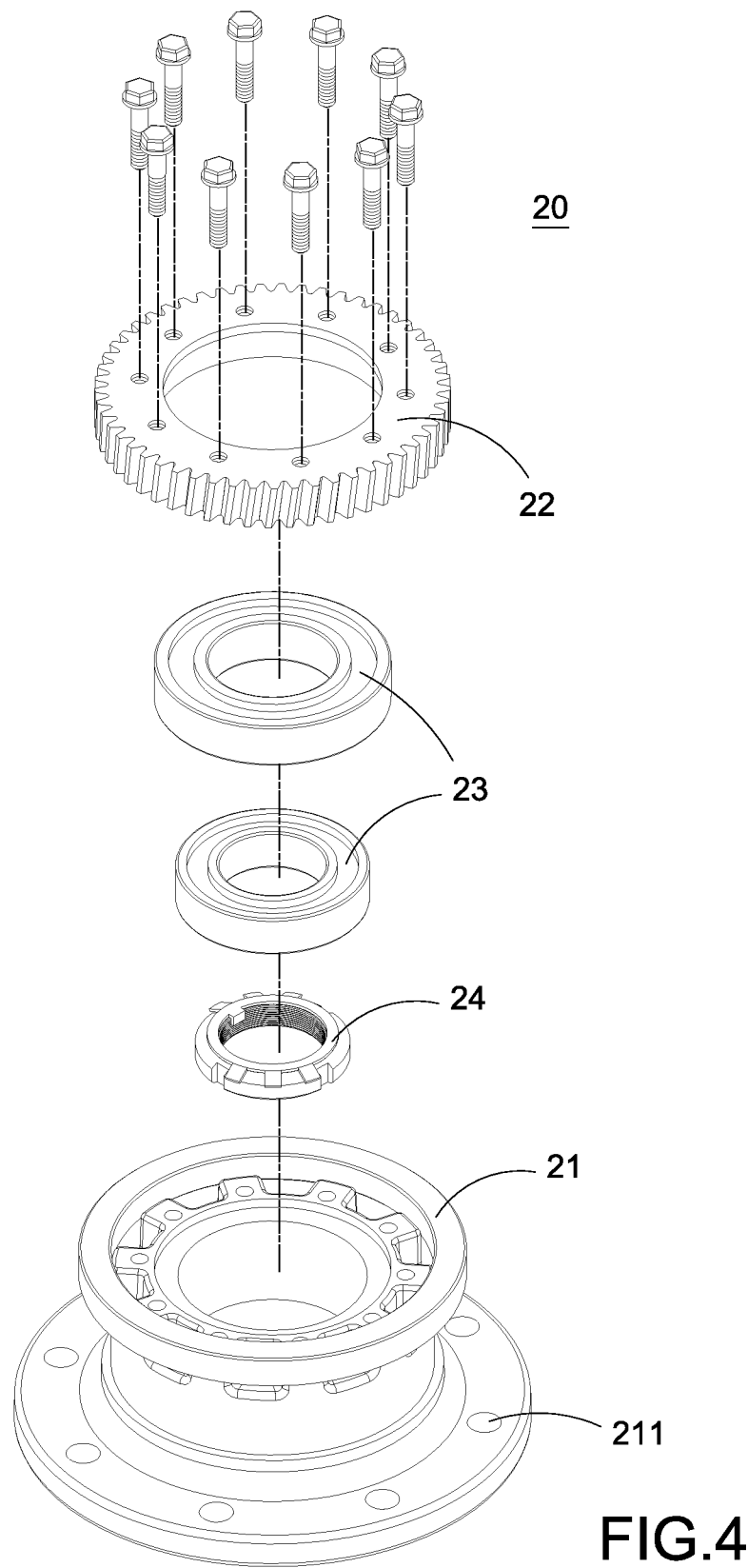
FIG. 4 is a perspective exploded view showing the rotary base according to the present invention.

Please refer to FIG. 2 and FIG. 3, the fixed base (10) is made through a metal material being processed with a casting means, and the fixed base (10) is formed with a tubular body (11); a flange defined at the bottom end of the tubular body (11) is formed with a plurality of through holes (12) spaced with intervals, thereby being able to be fastened on a vertical post (not shown in figures) of the solar tracking equipment by utilizing screwing members such as bolts. The core line defined in the tubular body (11) is formed with a central post (13), and a distal end of the central post (13) is formed with a thread segment (131). A lateral wall of the tubular body (11) is transversally extended with a rectangular case member (14) having an opening, and the interior of the case member (14) is communicated with the interior of the tubular body (11); inner sides defined on the wall and the bottom walls of the case member (14) are correspondingly formed with a set of U-shaped shaft seats (141).

Please refer to FIG. 2 and FIG. 4 to FIG. 6, the rotary base (20) is made through a metal material being processed with a casting means, and the rotary base (20) mainly includes a rotary unit (21), a worm gear (22), two bearing (23) and a nut (24). The rotary unit (21) is formed in a cylindrical status, and a flange defined at the bottom end thereof is formed with a plurality of penetrated holes (211) spaced with intervals, thereby being able to be fastened on a supporter (not shown in figures) of the solar tracking equipment by utilizing screwing members such as bolts. The worm gear (22) is fastened on the rotary unit (21) by utilizing screwing members such as bolts, the rotary unit (21) and the worm gear (22) are supported on the central post (13) of the fixed base (10) through the two bearings (23), and the nut (24) is fastened corresponding to the above-mentioned thread segment (131) thereby allowing the rotary base (20) and the fixed base (10) to be combined. In addition, the worm gear (22) is disposed in the internal space of the tubular body (11), so the worm gear (22) is able to be effectively prevented from being adhered with dusts or debris existed in the nearby environment.

Figure 5:
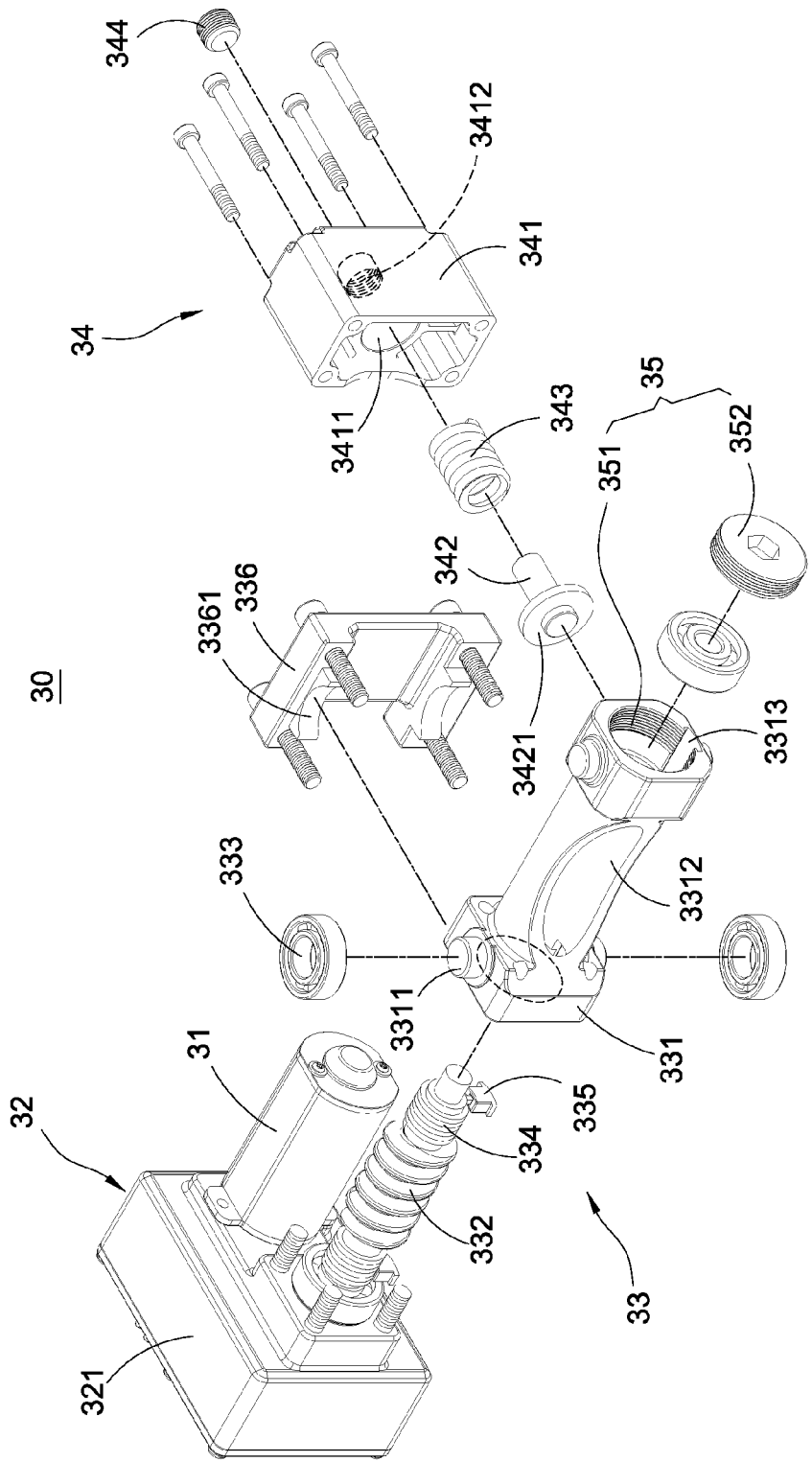
FIG. 5 is a perspective exploded view showing the driving module according to the present invention.
Figure 6:
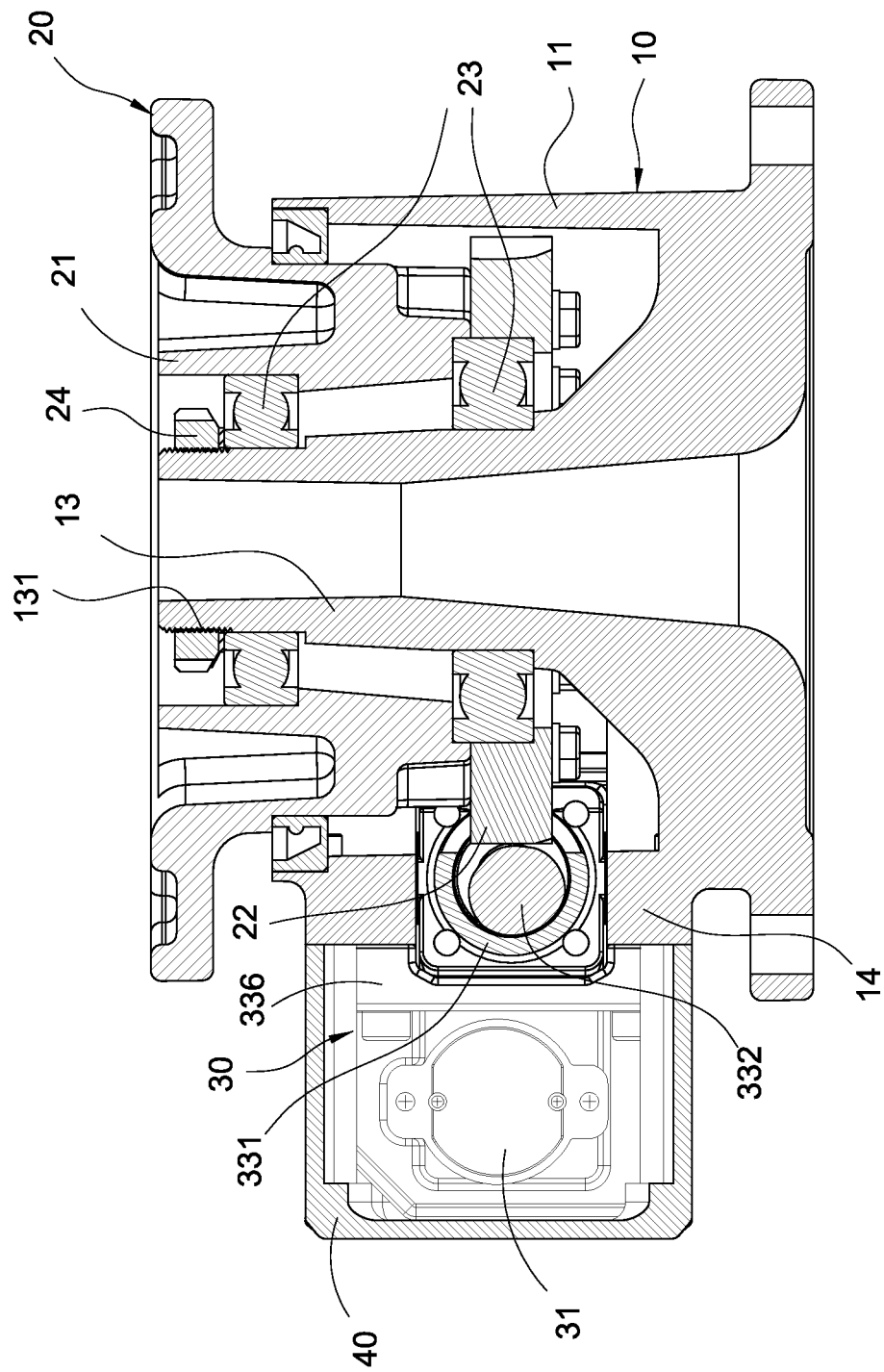
FIG. 6 is a longitudinal sectional view showing the assembly of the steering device according to the present invention.
Figure 7:
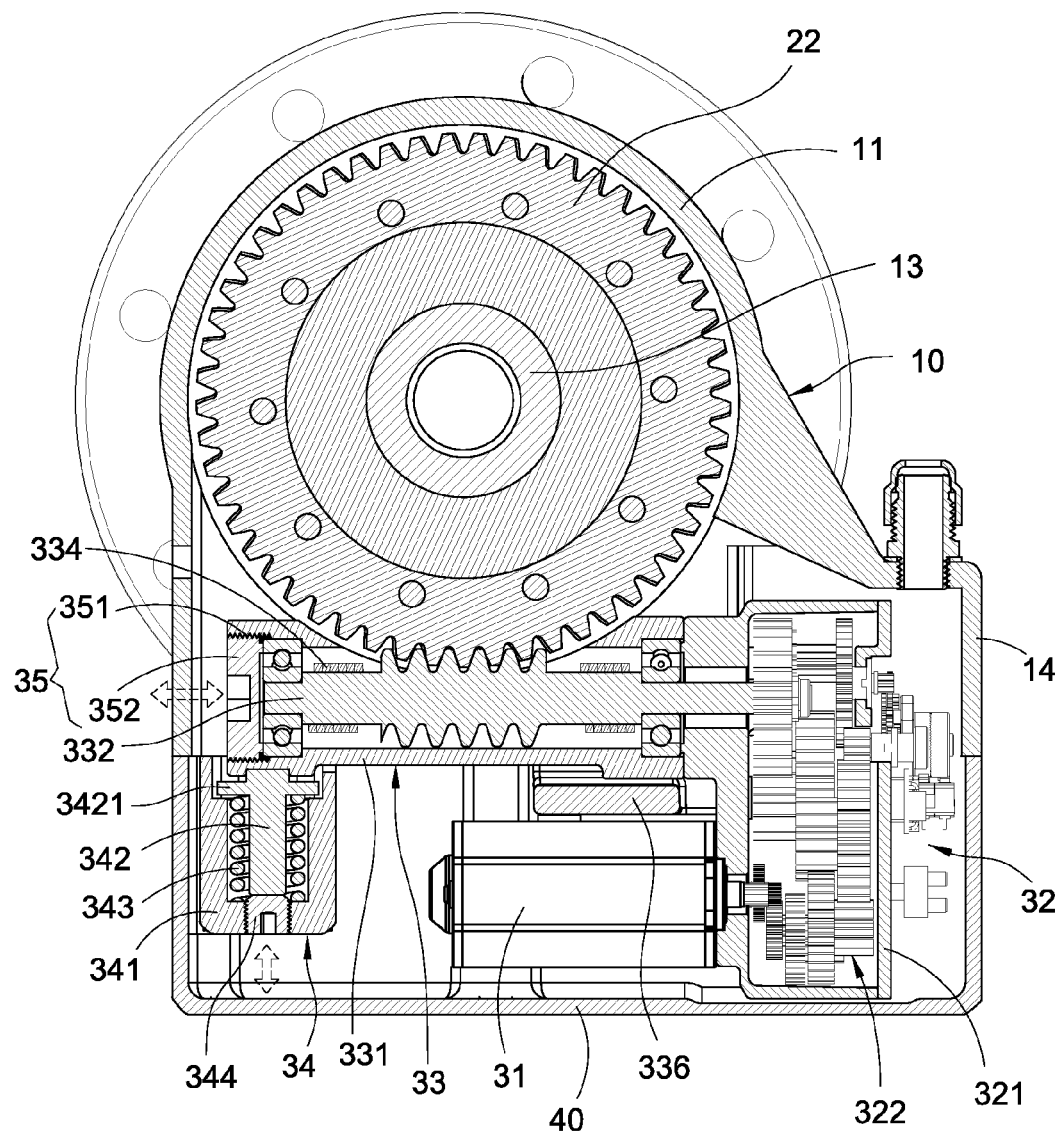
FIG. 7 is a cross sectional view showing an operating status of the steering device according to the present invention.

As shown in FIG. 2, FIG. 3 and FIG. 5, according to this embodiment, the driving module (30) mainly includes a motor (31), a reduction mechanism (32), a worm unit (33) and an adjustment mechanism (34). The reduction mechanism (32) mainly includes a gear box (321) and a plurality of gear sets (322) (as shown in FIG. 7) accommodated inside the gear box (321). The gear box (321) is substantially formed as a rectangular member. The motor (31) is fastened at one lateral side of the gear box (321), and one side of the gear box (321) opposite to the motor (31) is provided with a rear cover (323). The outer side of the rear cover (323) is provided with two limit switches (36), a signal outputting device (37), a bottom cam (38) and a top cam (39). The top cam (39) and the bottom cam (38) are mutually stacked and connected to each of the gear sets (322). The two limit switches (36) are mutually stacked and disposed adjacent to one lateral side of the top cam (39) and the bottom cam (38), wherein one of the limit switches (36) is disposed corresponding to the bottom cam (38), and the other limit switch (36) is disposed corresponding to the top cam (39). The signal outputting device (37) is disposed above each of the cams (38, 39), and the signal outputting device (37) can be a Hall sensor for sensing and memorizing the rotating location of the worm unit (33). In operation, the gear set (322) is served to drive a output signal magnet (not shown in figures), and a Hall circuit board is adopted for sensing signals, because the angles of the cams (38, 39) are different, the maximum operating angles are different and the quantity of output signals of the signal outputting device (37) is also different. Through installing the limit switches (36) and the signal outputting device (37) on the rear cover (323), external wires (not shown in figures) are able to be guided into the case member (14) and electrically connected to each of the limit switches (36) and the signal outputting device (37).

Moreover, when the motor (31) clockwise drives each of the gear sets (322) and the worm unit (33) for operation, the bottom cam (38) is able to be synchronously driven to rotate, when the bottom cam (38) is rotated to a certain location, a button on one of the limit switches (36) is pressed thereby terminating the electric signals and stopping the operation. On the other hand, when the motor (31) counterclockwise drives each of the gear sets (322) and the worm unit (33) for operation, the top cam (39) is able to be synchronously driven to rotate, when the top cam (39) is rotated to a certain location, a button on the other limit switch (36) is pressed thereby terminating the electric signals and stopping the operation. Wherein, the motor (31) can also counterclockwise drives each of the gear sets (322) and the worm unit (33) for operation, and the bottom cam (38), instead of the top cam (39), can be synchronously driven to rotate. According to the relative relations between the above-mentioned components, the installing angle of the top cam (39) is able to be adjusted for controlling the final output rotating angle of the rotary unit (21).

The worm unit (33) is fastened in the gear box (321) with a means of being parallel to the core of the motor (31) and disposed at the same side as the motor (31), and the worm unit (33) includes a cylindrical body (331) and a worm (332). One end of the cylindrical body (331) is respectively formed with a convex shaft (3311) extended upwardly and downwardly, and the central area of the cylindrical body (331) is formed with a recess (3312). The worm (332) is able to be supported in the cylindrical body (331) by utilizing supporting members such as a sleeve or a bearing, the above-mentioned recess (3312) allows the mid portion of the worm (332) to be protruded and exposed, and one end of the worm (332) defined adjacent to the convex shaft (3311) is penetrated into the gear box (321) for being connected to the gear sets (322).

Preferably, the worm unit (33) further includes a set of bearings (333), two brake springs (334), two positioning blocks (335) and a press seat (336). Wherein, each of the convex shafts (3311) is respectively received in each of the bearings (333) thereby being able to be disposed in the above-mentioned U-shaped shaft seats (141) through each of the bearings (333). The press seat (336) is formed with a set of concave arc-shaped blocks (3361) and fastened on the fixed base (10) by utilizing screwing members such as bolts, and each of the concave arc-shaped blocks (3361) and the U-shaped shaft seats (141) of the fixed base (10) are served to jointly clamp each of the bearings (333), thereby enabling the worm unit (33) and the fixed base (10) to be pivoted for connection. In addition, each of the convex shafts (331) can also be directly disposed in the above-mentioned U-shaped shaft seats (141) (not shown in figures).

Each of the brake springs (334) is sleeved at two distal ends of the worm (332) through a tightening means. The interior of the cylindrical body (331) is formed with a mount slot (3313), each of the positioning blocks (335) is mounted in the mount slot (3313) for being positioned, and one end of the brake spring (334) is inserted and fastened on the positioning block (335). The two brake springs (334) are respectively formed in opposite spiral directions, in other words one is a left spring and the other is a right spring, thereby respectively generating a brake effect to the normal and reverse rotation of the worm (332).

The adjustment mechanism (34) is disposed at one end (i.e. the free end) of the cylindrical body (331) defined away from the convex shaft (3311), and substantially perpendicular to the axial line of the worm (332). The adjustment mechanism (34) is served as a radial adjustment mechanism to the worm gear (22), and the radial adjustment mechanism (34) mainly includes a seat body (341), a push rod (342), an anti-loosening spring (343) and an adjustment screw (344). The seat body (341) is formed with a hollow chamber (3411) and a screw hole (3412) having the same central line, and the seat body (341) is fastened in the fixed base (10) by utilizing screw members such as bolts. The front portion of the push rod (342) is provided with a stop ring (3421), and the anti-loosening spring (343) is sleeved on the push rod (342) for being together received in the hollow chamber (3411). The anti-loosening spring (343) is elastically clamped between the stop ring (3421) and the seat body (341). The adjustment screw (344) is screwed in the screw hole (3412) and correspondingly in contact with the rear end of the push rod (342), and the front end of the push rod (342) is abutted against the cylindrical body (331). According to the above-mentioned assembly, the push rod (342) is enabled to apply a force on another side of the cylindrical body (331) opposite to the worm gear (22), and the supporting force applied by the push rod (342) or a resultant force of the supporting force is enabled to be oriented towards the axial line of the worm (332).

Preferably, the driving module (30) of the present invention further includes an axial adjustment mechanism (35), and the axial adjustment mechanism (35) mainly includes an inner screw hole (351) formed at an end part of the above-mentioned cylindrical body (331) and an axial adjustment screw (352) correspondingly screwed in the inner screw hole (351), an end surface of the axial adjustment screw (352) is in corresponding contact with an end surface of the worm (332), so the axial displacement of the worm (332) is able to be adjusted through screwing in or screwing out the axial adjustment screw (352), thereby no backlash being generated between the worm (332) and the worm gear (22).

Furthermore, the steering device provided by the present invention further includes a cover member (40), the cover member (40) is fastened on the case member (14) of the fixed base (10) by utilizing screw members such as bolts, and the case member (14) and the cover member (40) jointly cover the driving module (30).

Please refer to FIG. 7, with the above-mentioned assembly, the position of the worm gear (22) is remained to be fixed while being operated, and the positions where the convex shafts (3311) and the bearings (333) being clamped by the U-shaped shaft seats (141) of the fixed base (10) and the concave arc-shaped blocks (3361) of the press seat (336) are served as the rotation center; when a hand tool is used for rotating the adjustment screw (344) for the purpose of screwing in or screwing out, the push rod (342) is able to be driven to drive the cylindrical body (31) to swing towards the worm gear (22), thereby allowing the worm (332) and the worm gear (22) to be mutually engaged. When the radial adjustment operation to the worm (332) is finished, the rotation of the axial adjustment screw (352) is able to drive the worm (332) to be axially displaced, thereby enabling the engagement of the worm (332) and the worm gear (22) to be more sufficient or eliminating the backlash between the two.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A steering device for use in solar tracking equipment, including:
   a fixed base (10) formed with a central post (13) protruded from an inner surface thereof, and a pair of U-shaped shaft seats (141);
   a rotary base (20), correspondingly and fixedly connected to the fixed base (10) through the central post (13) and provided with a worm gear (22); and
   a driving module (30), installed on the fixed base (10) and including:
   a worm unit (33), including a cylindrical body (331), a pair of bearings (333) and a worm (332) accommodated in the cylindrical body (331), wherein a pair of convex shafts (3311) are formed at an end of the cylindrical body (331), each convex shaft (3311) is sheathed with a corresponding bearing (333), and each bearing (333) is pivotally received in a corresponding U-shaped shaft seat (141); and
   a radial adjustment mechanism (34), disposed corresponding to an opposite end of the cylindrical body (331) for adjusting a position of an axial direction of the worm (332) with the convex shafts (3311) served as a rotation axis, thereby enabling the worm (332) and the worm gear (22) to be mutually engaged.

2. The steering device for use in solar tracking equipment according to claim 1, wherein the worm unit (33) further includes a press seat (336) formed with a set of concave arc-shaped blocks (3361) and fastened on the fixed base (10), and each of the concave arc-shaped blocks (3361) and each U-shaped shaft seat (141) are served to jointly clamp each of the bearings (333).

3. The steering device for use in solar tracking equipment according to claim 1, wherein the worm unit (33) further includes two brake springs (334) and two positioning blocks (335), the two brake springs (334) are respectively sleeved at two ends of the worm (332) through a tightening means, the interior of the cylindrical body (331) is formed with a mount slot (3313), each of the positioning blocks (335) is mounted in the mount slot (3313) for being positioned, and one end of each of the brake springs (334) is fastened on each of the positioning blocks (335).

4. The steering device for use in solar tracking equipment according to claim 3, wherein the two brake springs (334) are respectively formed in opposite spiral directions.

5. The steering device for use in solar tracking equipment according to claim 1, wherein the radial adjustment mechanism (34) includes a seat body (341), a push rod (342) and an adjustment screw (344), the seat body (341) is formed with a hollow chamber (3411) and a screw hole (3412), and the seat body (341) is fastened in the fixed base (10), the push rod (342) is received in the hollow chamber (3411), and the adjustment screw (344) is screwed in the screw hole (3412) and correspondingly in contact with an end part of the push rod (342).

6. The steering device for use in solar tracking equipment according to claim 5, wherein the adjustment mechanism (34) further includes an anti-loosening spring (343), the push rod (342) is formed with a stop ring (3421), and the anti-loosening spring (343) is sleeved on the push rod (342) and elastically clamped between the stop ring (3421) and the seat body (341).

7. The steering device for use in solar tracking equipment according to claim 6, wherein the driving module (30) further includes an axial adjustment mechanism (35), and the axial adjustment mechanism (35) includes an inner screw hole (351) formed in the cylindrical body (331) and an axial adjustment screw (352) correspondingly screwed in the inner screw hole (351), and the axial adjustment screw (352) is correspondingly in contact with an end part of the worm (332).

8. The steering device for use in solar tracking equipment according to claim 1, wherein the fixed base (10) is formed with a tubular body (11), the rotary base (20) further includes a rotary unit (21) and another bearing (23), the worm gear (22) is fastened on the rotary unit (21), and the rotary unit (21) is supported on the central post (13) through the another bearing (23), and the worm gear (22) is disposed inside the fixed base (10).

9. The steering device for use in solar tracking equipment according to claim 8, wherein a distal end of the central post (13) is formed with a thread segment (131), the rotary base (20) further includes a nut (24), and the nut (24) is fastened corresponding to the thread segment (131).

10. The steering device for use in solar tracking equipment according to claim 8, wherein a peripheral wall of the tubular body (11) is extended with a case member (14), and the interior of the case member (14) is communicated with the interior of the tubular body (11), the worm unit (33) is disposed in the case member (14), the central area of the cylindrical body (331) is formed with a recess (3312) allowing the worm (332) to be protruded and exposed for being engaged with the worm gear (22).

11. The steering device for use in solar tracking equipment according to claim 10, further including a cover member (40), and the cover member (40) is served to seal the case member (14) and jointly cover the driving module (30).

12. The steering device for use in solar tracking equipment according to claim 1, wherein the driving module (30) further includes a motor (31) and a reduction mechanism (32), and the reduction mechanism (32) includes a gear box (321) and a plurality of gear sets (322) accommodated inside the gear box (321), the motor (31) is fastened at one lateral side of the gear box (321), and the motor (31) is allowed to penetrate into the gear box (321) for being connected to each of the gear sets (322).

13. The steering device for use in solar tracking equipment according to claim 12, wherein the gear box (321) further includes a rear cover (323), and the rear cover (323) is installed with a plurality of limit switches (36) and a plurality of cams (38, 39) respectively disposed corresponding to each of the limit switches (36), and each of the cams (38, 39) is served to control each of the limit switches (36) for being opened or closed.

14. The steering device for use in solar tracking equipment according to claim 13, wherein the rear cover (323) is further installed with a signal outputting device (37).

* * * * *